US011140139B2

United States Patent
Hassan et al.

(10) Patent No.: US 11,140,139 B2
(45) Date of Patent: Oct. 5, 2021

(54) ADAPTIVE DECODER SELECTION FOR CRYPTOGRAPHIC KEY GENERATION

(71) Applicant: Microsoft Technology Licensing, LLC, Redmond, WA (US)

(72) Inventors: Amer A. Hassan, Kirkland, WA (US); Bradford R. Clark, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 16/197,846

(22) Filed: Nov. 21, 2018

(65) Prior Publication Data
US 2020/0162438 A1    May 21, 2020

(51) Int. Cl.
*H04L 29/06*  (2006.01)
*H04B 1/38*   (2015.01)
(Continued)

(52) U.S. Cl.
CPC ........... *H04L 63/0435* (2013.01); *H04B 1/38* (2013.01); *H04L 9/0861* (2013.01); *H04L 9/12* (2013.01); *H04L 2209/80* (2013.01)

(58) Field of Classification Search
CPC ............. H04L 63/0435; H04L 63/0442; H04L 63/061; H04L 63/068; H04L 9/0861;
(Continued)

(56) References Cited

U.S. PATENT DOCUMENTS 4,691,355 A * 9/1987 Wirstrom .............. G06F 21/34
380/47
5,457,680 A * 10/1995 Kamm .................. H04W 8/04
370/332
(Continued)

FOREIGN PATENT DOCUMENTS

EP          2154814 A1    2/2010
WO     2017194476 A1    11/2017

OTHER PUBLICATIONS

Hemavathi M N et al., A Survey on Secret Key Extraction Using Received Signal Strength in Wireless Networks, International Journal on Recent and Innovation Trends in Computing and Communication (Year: 2014).*

(Continued)

*Primary Examiner* — Kambiz Zand
*Assistant Examiner* — Mahabub S Ahmed
(74) *Attorney, Agent, or Firm* — Schwegman Lundberg & Woessner, P.A.

(57) ABSTRACT

A method and apparatus for encrypting communications between two radio frequency (RF) transceivers selects a level of encryption based on device characteristics of the two RF transceivers. Each RF transceiver generates a common sequence having an integer, M, symbols based on the selected encryption level and on signals received from the other RF transceiver. Each RF transceiver then generates a cryptographic key based upon the common sequence, encrypts a message using the cryptographic key, and sends the encrypted message to the other RF transceiver. In one
(Continued)

embodiment, the M symbols are selected from an alphabet where the value M and the size of the alphabet are selected based on the device characteristics of the two RF transceivers.

20 Claims, 6 Drawing Sheets

(51) Int. Cl.
*H04L 9/08* (2006.01)
*H04L 9/12* (2006.01)

(58) Field of Classification Search
CPC ....... H04L 9/12; H04L 9/0285; H04L 9/0875; H04L 9/088; H04L 2209/80; H04L 2463/062; H04B 1/38; H04W 12/0401
USPC .................................................. 380/274, 285
See application file for complete search history.

(56) References Cited

U.S. PATENT DOCUMENTS

| | | | |
|---|---|---|---|
| 5,604,806 A | | 2/1997 | Hassan et al. |
| 5,995,533 A * | | 11/1999 | Hassan .................. H04J 13/00 375/140 |
| 7,092,427 B1 * | | 8/2006 | Tollefson ............. H04B 1/7143 375/132 |
| 7,245,947 B2 * | | 7/2007 | Salokannel ....... H04W 52/0219 455/574 |
| 8,234,505 B2 | | 7/2012 | Anderson |
| 8,542,828 B2 * | | 9/2013 | Rudland .............. H04L 9/0841 380/46 |
| 9,049,010 B2 * | | 6/2015 | Jueneman ............... G06F 21/72 |
| 9,699,652 B2 * | | 7/2017 | Guillaume ........... H04W 12/04 |
| 9,721,071 B2 | | 8/2017 | Chan et al. |
| 9,992,015 B2 * | | 6/2018 | Fu ............................. H04L 9/08 |
| 10,154,383 B2 * | | 12/2018 | Ueki ....................... H04W 4/40 |
| 10,848,470 B2 * | | 11/2020 | Shattil .................. H04L 5/0007 |
| 10,887,291 B2 * | | 1/2021 | Davis ................. H04L 63/0435 |
| 2001/0038695 A1 * | | 11/2001 | Kim ...................... H04L 9/0838 380/283 |
| 2006/0252381 A1 * | | 11/2006 | Sasaoka ................ H04L 9/0838 455/78 |
| 2007/0036353 A1 * | | 2/2007 | Reznik ................ H04L 63/1466 380/30 |
| 2007/0223438 A1 * | | 9/2007 | Bennett .................. H04W 88/04 370/338 |
| 2007/0225026 A1 * | | 9/2007 | Bennett .................. H04W 52/04 455/522 |
| 2007/0238417 A1 * | | 10/2007 | Bennett .................. H04W 52/24 455/69 |
| 2007/0253352 A1 * | | 11/2007 | Arisha ................ H04W 52/245 370/328 |
| 2009/0111532 A1 * | | 4/2009 | Salokannel ............ H04L 45/00 455/574 |
| 2009/0225982 A1 * | | 9/2009 | Yener ...................... H04L 63/06 380/44 |
| 2010/0128876 A1 * | | 5/2010 | Yang ...................... H04L 9/085 380/259 |
| 2011/0135088 A1 * | | 6/2011 | Rudland .............. H04L 9/0841 380/46 |
| 2012/0159183 A1 * | | 6/2012 | Adams .................. G06F 21/577 713/189 |
| 2013/0044028 A1 * | | 2/2013 | Lea ..................... H01Q 21/065 342/359 |
| 2013/0247117 A1 * | | 9/2013 | Yamada .................. G08C 17/02 725/93 |
| 2014/0198915 A1 * | | 7/2014 | Ballakur ............... H04W 12/03 380/270 |
| 2014/0355762 A1 * | | 12/2014 | Zhang ................... H04L 9/0816 380/270 |
| 2015/0092942 A1 * | | 4/2015 | Wager ................... H04L 63/061 380/270 |
| 2015/0199496 A1 * | | 7/2015 | Deter ..................... G06F 21/608 726/1 |
| 2015/0381357 A1 * | | 12/2015 | Guillaume ............ H04W 12/04 380/44 |
| 2016/0337122 A1 * | | 11/2016 | Kwak .................... H04L 9/0875 |
| 2017/0005794 A1 | | 1/2017 | Paddon et al. |
| 2017/0063827 A1 * | | 3/2017 | Ricardo ................ H04L 63/083 |
| 2017/0064547 A1 * | | 3/2017 | Klaue .................... H04L 9/0838 |
| 2017/0170959 A1 * | | 6/2017 | Huth ..................... H04L 9/0875 |
| 2017/0171749 A1 * | | 6/2017 | Huth ..................... H04B 17/318 |
| 2017/0249791 A1 * | | 8/2017 | Woo .................... G07C 9/00309 |
| 2017/0318589 A1 * | | 11/2017 | Negus .................. H04L 5/0007 |
| 2017/0329319 A1 * | | 11/2017 | Kopp ............... H02J 13/00012 |
| 2018/0013553 A1 | | 1/2018 | Hassan |
| 2018/0013559 A1 | | 1/2018 | Hassan |
| 2018/0020442 A1 * | | 1/2018 | Nair .................... H04B 7/15528 |
| 2018/0167368 A1 * | | 6/2018 | Vendelbo ................ G06F 21/64 |
| 2019/0018852 A1 * | | 1/2019 | Ohishi ................... H04W 4/70 |
| 2019/0020473 A1 * | | 1/2019 | Moli Re ............... H04L 9/0875 |
| 2019/0158276 A1 * | | 5/2019 | Troutman ................ H04L 1/18 |
| 2019/0180742 A1 * | | 6/2019 | Kothari ............... G10L 15/1822 |
| 2019/0191191 A1 * | | 6/2019 | Xu ..................... H04N 21/2665 |
| 2019/0394651 A1 * | | 12/2019 | Wifvesson .......... H04W 12/033 |

OTHER PUBLICATIONS

Satya Ponnaluri et al., A Practical Wireless Reciprocity-aware Key Establishment Protocol, IEEE Explore (Year: 2016).*
Nicola Cinefra, An adaptive indoor positioning system based on Bluetooth Low Energy RSSI, POLITECNICO DI MILANO (Year: 2013).*
R. Chandramouli, et al., Battery Power-Aware Encryption, ACM Transactions on Information and System Security, vol. 9, No. 2, May 2006, pp. 162-180. (Year: 2006).*
Xiaojun Zhu et al., Extracting Secret Key from Wireless Link Dynamics n Vehicular Environments, 2013 Proceedings IEEE INFOCOM (Year: 2013).*
Paolo Barsocchi et al., A cyber-physical approach to secret key generation in smart environments, J Ambient Intell Human Comput (2013) 4:1-16 (Year: 2011).*
Yunchuan Wei et al., Adaptive Wireless Channel Probing for Shared Key Generation, IEEE INFOCOM 2011 (Year: 2011).*
Suman Jana et al., On the Effectiveness of Secret Key Extraction from Wireless Signal Strength in Real Environments, MobiCom'09, Sep. 20-25, 2009, Beijing, Chin (Year: 2009).*
Peng Hao, Wireless Device Authentication Techniques Using Physical-Layer Device Fingerprint, Ph.D. Thesis at The University of Western Ontario (Year: 2015).*
Cornelius Saiki, A Novel Physical Layer Key Generation and Authenticated Encryption Protocol Exploiting Shared Randomness, M.S. Thesis at University of Essex Date of Submission: Apr. 10, 2016 (Year: 2016).*
Application as Filed in U.S. Appl. No. 15/890,148, filed Feb. 6, 2018, 49 Pages.
Hjelm, et al., "Situation-Aware Adaptive Cryptography", Retrieved from: http://lup.lub.lu.se/luur/download?func=downloadFile&recordOId=8936871&fileOId=8937080, Feb. 28, 2018, 83 Pages.
Padgette, et al., "Guide to Bluetooth Security", In NIST Special Publication, vol. 800, Issue 121, Oct. 1, 2016,63 Pages.
"International Search Report and Written Opinion Issued in PCT Application No. PCT/US19/061338", dated Feb. 14, 2020, 13 Pages.

* cited by examiner

ADAPTIVE DECODER SELECTION FOR CRYPTOGRAPHIC KEY GENERATION

BACKGROUND

Different types of devices have different characteristics, including different data processing resources and different levels of data sensitivity. These considerations impact the choice of data security methods the device implements. For example, using a single encryption/decryption method across multiple devices may not be desirable because, if the method is too complex it may overburden devices having relatively simple resources, such as Internet of things (IoT) devices and if the method is too simple, it may not afford sufficient protection for data exchanged among devices having greater resources.

Many cryptography methods employ key servers or otherwise exchange cryptographic keys among multiple devices. Other devices generate and exchange keys or partial keys among two or more devices. Obtaining cryptographic keys from servers or exchanging keys risks interception of the keys and, thus, malicious decryption of data encrypted with the keys. Effective cryptographic key distribution is an important element of a secure communication system. While current methods can ensure effective key distribution in many instances, they are still vulnerable to attack.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to one aspect, a method for encrypting communications between a first radio frequency (RF) transceiver and a second RF transceiver includes determining device characteristics of the first and second RF transceivers and selecting a level of encryption based on the determined device characteristics. The method further includes generating a common sequence, having an integer, M, symbols, based on the device characteristics, the selected encryption level, and signals received from the second RF transceiver and creating a cryptographic key based upon the common sequence. The method includes each of the first and second RF transceivers encrypting a message with the cryptographic key and sending the encrypted message to the other RF transceiver.

According to another aspect, an encryption apparatus for a first radio frequency (RF) transceiver includes RF front-end circuitry, a memory including instructions, and a processor. The processor is configured by the instructions to determine device characteristics of a second RF transceiver and select a level of encryption based on device characteristics of the first RF transceiver and the determined device characteristics of the second RF transceiver. The processor is further configured by the instructions to generate a common sequence having an integer, M, symbols based on the selected encryption level and signals received from the second RF transceiver. The processor is configured by the instructions to create a cryptographic key based upon the common sequence, to encrypt a message with the cryptographic key, and to send the encrypted message to the second RF transceiver.

The following description and the annexed drawings set forth in detail certain illustrative aspects of the claimed subject matter. These aspects are indicative, however, of a few of the various ways in which the principles of the claimed subject matter may be employed and the claimed subject matter is intended to include all such aspects and their equivalents. Other advantages and novel features of the claimed subject matter will become apparent from the following detailed description when considered in conjunction with the drawings.

DETAILED DESCRIPTION

Figure 1:
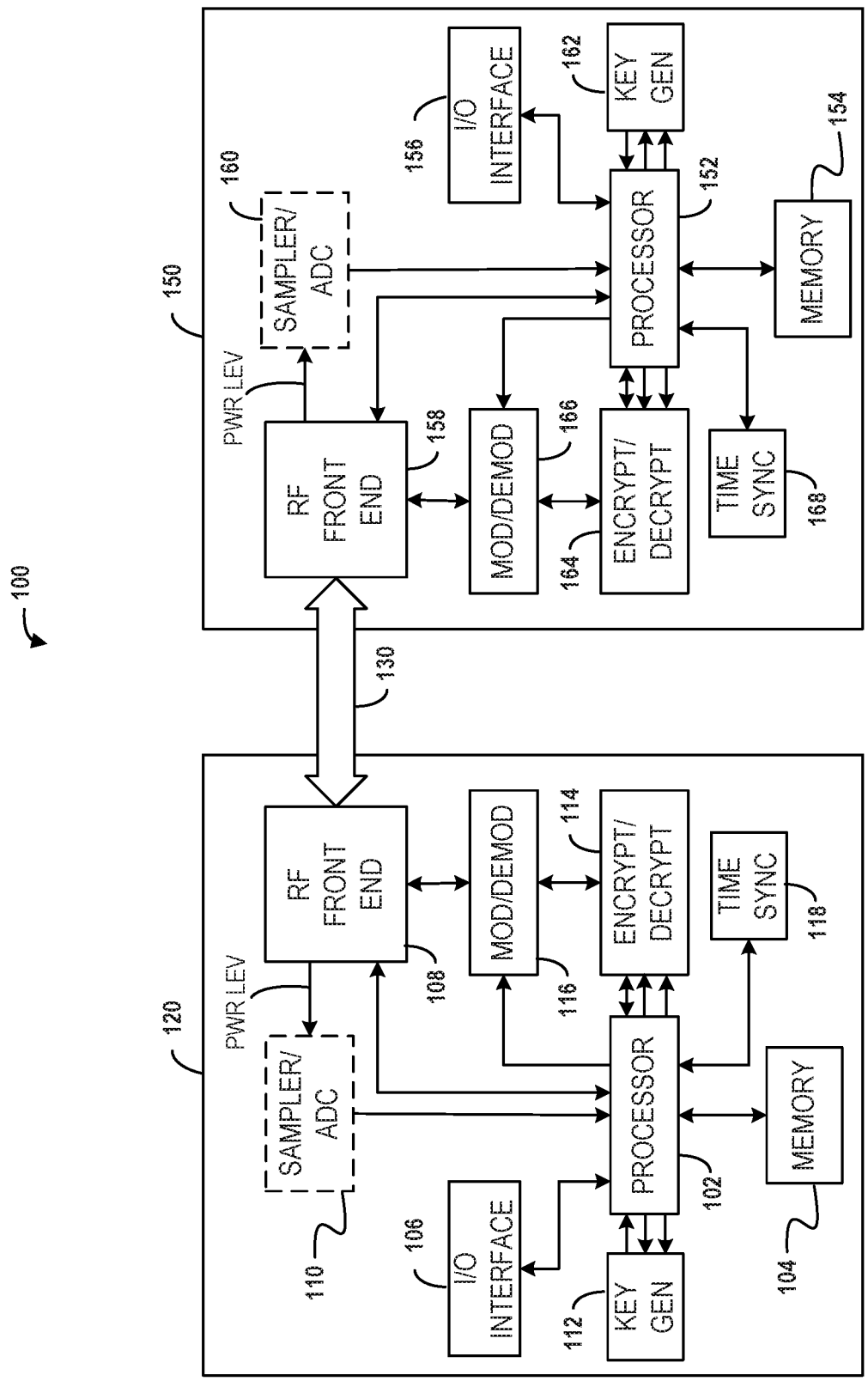
FIG. 1 is a functional block diagram of a radio frequency (RF) network showing details of two RF transceivers according to an example embodiment.

The disclosed embodiments describe an encryption apparatus and encryption methods by which two RF transceivers can determine a type of encryption to be used for communications between the two transceivers and can independently create matching cryptographic keys while exchanging little or no information about the keys. These embodiments provide a technical advantage in that two RF transceivers may create matching keys that are compatible with the characteristics of the devices coupled to the two RF transceivers including remaining battery life of a device including processing resources available to at least one of the devices—and use the keys to encrypt and decrypt data for secure communications on a channel between the two RF transceivers without exchanging keys or key related information over any channel. The example embodiments provide another advantage in that the communicating RF transceivers may determine the keys immediately before initiating each encrypted communication.

The RF channel(s) between two transceivers is/are reciprocal; RF signals sent from the first transceiver to the second transceiver and from the second transceiver to the first transceiver experience essentially the same channel characteristics. Thus, the power level of the signals received via the channel(s) are similar and exhibit similar variations due to environmental conditions and due to the presence of other communication sessions Thus, when similar equipment is used on both sides of the RF channel, each RF transceiver receives similar signals from the other RF transceiver, during the predetermined interval, at similar power levels. The power levels of signals received at a plurality of instants may be captured and converted into a sequence used to generate a cryptographic key for use by both RF transceivers. As described below, the cryptographic key may be created directly from a sequence derived from the successive power levels, for example, by applying the sequence derived from the power level values to an error correction code (ECC) decoder. The ECC decoder perform a many-to-one mapping so that slight variations between the power levels sensed by the two RF transceivers may be mapped to a common cryptographic key. Furthermore, the two RF transceivers may determine a type of encryption to use and, thus, a type of cryptographic key to generate based on the capabilities of the devices in which the two transceivers are implemented.

ECC decoders are typically used to correct errors in transmitted data. For example, a Reed-Solomon decoder may be able to correct one-bit or two-bit errors in individual data Values in a data stream. In the embodiments described below, the ECC decoder is not used to correct errors but to map values resulting from a sequence of measurements into a common value. Example ECC decoders may correct a 1-bit or 2-bit error occurring in any bit of a data value based on redundant bits in the data values. In example embodiments described below, the ECC decoders may cause the two RF transceivers to generate a common sequence even though the sequence of measurement symbols generated by the RF transceivers differ from each other in one or two locations.

Each RF transceiver may determine the type of encryption it will use based on the its device characteristics and the device characteristics of the other RF transceiver. The device characteristics of an RF transceiver may be characteristics of the RF transceiver and/or of a corresponding computing device coupled to the RF transceiver. In example embodiments, these characteristics include computing resources available to the RF transceiver and/or the corresponding device, the battery status of the RF transceiver and/or corresponding device, and/or on the sensitivity of the data being exchanged. To indicate available resources the each of the RF transceivers may exchange data including, without limitation, an indication of whether the RF transceiver and/or corresponding device has a high-level, medium-level, or low-level processor, an amount of its available memory, and an identification of specific encryption/decryption algorithms implemented on the RF transceiver. The sensitivity of the data being exchanged may be indicated as non-confidential, confidential, or secret. These indications may be provided by users of the one or more of the devices employing the RF transceivers. The battery power of an RF transceiver and/or corresponding device may be sent as a specific percentage or as a two-bit value indicating high, medium, or low. The sending RF transceiver may store the device characteristics sent to the other RF transceiver and the device characteristics received from the other RF transceiver for use in generating the encryption key, as described below.

For example, an IoT device such as a light fixture or an appliance may use a microcontroller and limited memory that is incompatible with complex encryption process, such as the Elliptic Curve, or Rivest-Shamir-Adleman (RSA). Furthermore, it may be sufficient to use a relatively low-level encryption algorithm, such as the Data Encryption Standard (DES), Triple DES or the advanced encryption standard (AES), as the type of data exchanged between the IoT device and a control hub or status reader is not sensitive.

Devices having greater resources, such as smart watches and Bluetooth headsets that convey more sensitive information, desirably use a higher-level encryption algorithm. At a given time, however, these devices may not have sufficient remaining battery power to support the higher-level encryption algorithm. Thus, these devices may select an intermediate encryption algorithm when they have sufficient remaining battery power or when they have sensitive data to be transferred and otherwise select a low-level encryption algorithm to conserve their battery power. Devices having significant computing resources and an independent power source, such as computers using high-speed multi-core processors and large blocks of available memory, and which exchange sensitive data, such as financial records, may implement complex encryption algorithms.

Some embodiments described below determine the level of encryption to be used based on the characteristics of the devices including available resources, battery power, available to one or more of the devices and the sensitivity of the data to be transferred. This determination may be hard coded into a device, such as an IoT device, or it may be determined through an unencrypted exchange of packets between or among devices in a communication session prior to sending any encrypted content. As described below with reference to FIGS. 4 and 5, these unencrypted packets may also be used to generate a sequence of symbols used to generate the cryptographic key based on the sensed RF power levels of the packets during sequence generation, as described below.

In embodiments described below, two or more devices include RF transceivers that may be used to independently generate a common sequence of symbols, based on the sensed power levels and the determined level of encryption. The common sequence of symbols may then be used to independently generate a single key that may be used to exchange data between or among the devices. The materials below describe data exchanges between two devices each having a respective RF transceiver. It is contemplated however, that embodiments using three or more devices may operate in the same way to exchange encrypted data in a broadcast or multicast environment.

Because the RF power levels sensed during the predetermined intervals depend on the characteristics of the two RF transceivers and the RF channel(s) as experienced by the two RF transceivers, the power levels of the signals received by the two transceivers during a given interval exhibit similar variations. Thus, once an encryption method is selected, the RF transceivers can generate similar sequences from the sensed power levels. Because the RF transceivers generate the sequences based on the characteristics of the respective transceivers and RF channel(s), sequences created at different times may be subject to different characteristics (e.g., thermal effects) so that each new sequence is likely to be different from the previously generated sequence. Consequently, each new cryptographic key generated at is likely to be different from previously generated cryptographic keys. As described below, example embodiments may generate a new key for each message. As the cryptographic is randomly generated based on characteristics of the channel between the RF transceivers, the encryption methods described below can provide robust protection even when a relatively simple encryption algorithm is used.

Each of the first and second RF transceivers may use the created sequence of symbols to generate the same cryptographic key which may then be used to encrypt and transmit data from the first transceiver and the second transceiver and to decrypt data received from the second transceiver at the first transceiver. The example embodiments use symmetric encryption algorithms such that each of the transceivers encrypt and decrypt data using the same cryptographic key. In some embodiments, each transceiver may independently create the sequence of symbols and generate the cryptographic key based on a selected level of encryption and then use the key to transmit and receive a known data set at times determined by a predetermined protocol to verify that both devices are using the same key. When one RF transceiver cannot receive the known data set using the determined cryptographic key, the RF transceiver may determine that the two keys do not match and restart the process to create a new sequence of symbols and a new cryptographic key. This process continues until both transceivers have created the same cryptographic key. The predetermined protocol may also determine other parameters for generating the key, such as target transmit power levels used by the devices. The power levels may be determined, for example, based on the relative locations of the two RF transceivers, as determined, for example, using respective global navigation satellite system (GNSS) receivers.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct operations performed in a certain order. Such implementations are examples and non-limiting. Certain operations described herein can be grouped together and performed in a single operation, certain operations can be broken apart into multiple component operations, and certain blocks can be performed in an order that differs from that which is illustrated herein, including a parallel manner of performing the operations. The operations shown in the flowcharts can be implemented by software, hardware, firmware, manual processing, or the like. As used herein, hardware may include single-core or multi-core microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system which may include a single-core or multi-core microprocessor, a microcontroller and/or a digital signal processor (DSP).

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a block diagram of a portion of a network 100 including two RF transceivers 120 and 150 coupled by an RF channel 130. The RF channel may include any wireless transmission channel such as a Wi-Fi channel or a cellular transmission channel (e.g., 3G, 4G, or 5G). The example RF transceiver 120 includes a processor 102, a memory 104, an input/output (I/O) interface 106, an RF front end 108, an optional sampler/analog-to-digital converter (ADC) 110, a key generator 112, an encryption/decryption processor 114, a modulator/demodulator 116, and time synchronization circuitry 118 (e.g., a global navigation satellite system (GLASS) receiver). Similarly, example RF transceiver 150 includes a processor 152, a memory 154, an input/output (I/O) interface 156, an RF front end 158, an optional sampler/analog-to-digital converter (ADC) 160, a key generator 162, an encryption/decryption processor 164, a modulator/demodulator 166, and time synchronization circuitry 168. The elements of the RF transceiver 150 operate in the same way as the corresponding elements of the RF transceiver 120. The memories 104 and 154 may hold instructions for the respective processors 102 and 152 and may also hold data used in the sequence generation and key generation as described below. The following materials describe the operation of the elements of the RF transceiver 120. This description also applies to the corresponding elements of the RF transceiver 150.

The RF front end 108 may include one or more antennas (not shown) and/or RF couplers (not shown), one or more RF amplifiers (not shown), an automatic gain control circuit (AGC) (not shown), a receiver (not shown), and a transmitter (not shown). The RF front end 108 may also include circuitry to generate a digital power level signal, PWR LEV, such as received signal strength indication (RSSI) and/or received channel power indication (RCPI), from a control signal of the AGC. The AGC monitors the received signal and generates a control signal that adjusts the gain applied by the RF amplifier(s) to normalize the output signal amplitude. Thus, the PWR LVL signal is inversely proportional to the AGC control signal in that the larger the AGC signal the smaller the power level of the signal received at the RF receiver and vice versa. Where the RF front end generates digital power level signals such as RSSI and RCPI, the optional sampler/ADC 110 is not used and the digital RSSI and RCPI values are applied directly to the processor 102. As an alternative to generating the power level signal in the RF circuitry, the processor 102 may employ a wireless network monitoring tool, such as Wireshark®, Kismet® or Inssider® to generate a power level signal. The example power level measurements include RSSI, which may be generated from the preamble of a received packet signal and RCN which may be generated from the entire packet. While some embodiments use packet-based transmissions, it is contemplated that other methods may be used to measure the power level of a received circuit, for example, using the optional sampler/ADC 110 to sample and digitize an analog reference signal received with the data transmission or an amplified unmodulated carrier transmitted in a predetermined interval by each of the RF transceivers. It is also contemplated that multiple power measurements may be combined to generate a single power level value, for example averaging RSSI and RCPI.

When RF transceiver 120 receives signals from the RF transceiver 150, the RF front end 108 provides a received signal to modulator/demodulator circuitry 116 which demodulates the received signal to provide a baseband signal including encrypted data received from the transceiver 150. The modulation/demodulation performed by the circuitry 116 depends on the type of transceiver used. The RF front end circuitry 108 also provides a measured power level signal, such PWR LEV, RSSI, or RCPI, to the processor 102. The processor 102 uses the power level measurements to create the sequence of symbols that is used to generate the cryptographic key, as described below. The process of creating the sequence and the cryptographic key is described below with reference to FIGS. 2, 3, 4, and 5.

The processor 102 is coupled to the memory 104 which holds instructions and data structures used by the processor 102 to implement the processing described herein. The memory 104 may include, without limitation, random access memory (RAM) read-only memory (ROM) and/or electronically alterable memory such as flash memory. The example processor 102 shown in FIG. 1 may also be coupled to the time synchronization circuitry 118 and may use a time signal provided by a GNSS receiver to synchronize its processing with the other RF transceivers 120 and 150. As an alternative to using the GNSS receiver, the RF transceiver may use a radio for another time service, such as the WWV or WWVB services offered by the National Institute of Standards and Technology (NIST). In this instance, the time synchronization circuitry 118 may be replaced by a radio receiver and decoder tuned to the WWV or WWVB broadcast frequency. In another alternative, the RF transceivers 120 and 150 may employ a time synchronization protocol such as the network time protocol (NTP) or precision time protocol (PTP) as the time synchronization circuitry 118 to maintain clock synchronization.

The modulation/demodulation circuitry 116 may include baseband processing circuitry (not shown) that generates digital data packets from the demodulated signal. In some embodiments, the baseband processing circuitry may provide a power level signal to the processor 102. In these embodiments, the RF front end 108 may provide, to the processor 102, data indicating an amount of gain or attenuation applied to the received RF signal by the RF front end 108. In these embodiments, the processor 102 may calculate the power level of the signal received at the receiver by adjusting the power level signal received from the baseband processing circuitry to compensate for the gain or attenuation applied by the RF front end 108. The processor 102 may provide the data packets and/or data extracted from the data packets to other circuitry (not shown) external to the RF transceiver 120 via the I/O interface 106.

When the RF transceiver 120 transmits data, the processor 102 may receive the data to be transmitted from the I/O interface 106. The processor 102 then provides the sequence of symbols to be used to generate the cryptographic key to the key generator 112 and provides the data (e.g., data packets) to be transmitted and the cryptographic key to the encryption/decryption circuitry 114. The encryption/decryption circuitry 114 encrypts the data and provides the encrypted data to the modulation/demodulation circuitry 116 where it is modulated for transmission to the RF transceiver 150 by the RF front end 108.

The example RF transceiver 150 includes components similar to the components of the RF transceiver 120 and performs the same functions. For the sake of brevity, the functions performed by the transceiver 150 to receive and transmit data are not described in detail as they mirror the functions performed by the RF transceiver 120, described above. The example transceiver 150 includes RF front end circuitry 158, a processor 152, a memory 154, time synchronization circuitry 168, a key generator 162, encryption/decryption circuitry 164, a modulator/demodulator 166, and an input/output (I/O) interface 156. As with the RF front end 108 circuitry, the RF front end circuitry 158 may include one or more antennas (not shown) and/or RF couplers (not shown), a receiver (not shown), and a transmitter, (not shown). The RF front end circuitry 158 may also include circuitry to provide a digital power level signal such as a received signal strength indication (RSSI) or received channel power indicator (RCPI) or an analog power level signal (e.g., PWR LEV).

As described below, the RF transceivers 120 and 150 may be any RF transceivers as long as they have similar characteristics and/or as long as the characteristics of each of the transceivers is known to the other transceiver. Indeed, it may be advantageous to use relatively low-quality devices, at least for sequence creation, as these devices tend to exhibit greater variability in their steady-state operations than higher-quality devices. This greater variability may result in successively created sequences of symbols having greater differences, and, thus, may enhance the ability of the RF transceivers 120 and 150 to identify a suitable common sequence of symbols and generate a common cryptographic key.

An example embodiment generates a sequence of symbols from successive power measurements, as described below. The power level measurements of the RF signals received by one RF transceiver, however, may have one or more symbol differences compared to the power level measurements of the signals received by the other RF transceiver. Thus, sequences of symbols generated from the power level measurements may not be identical in the two RF transceivers. The power level measurements, for example, may exhibit low-level variations due to thermal noise. In some embodiments, the power level measurements may be further processed to generate symbols including only selected bits of the power level measurements. Furthermore, zero-valued symbols may be ignored.

Each RF transceiver 120 and 150 may use other measurements than power level to generate the sequence of symbols. In a packet-based system, for example, each of the transceivers may monitor packet latency measurements or bit error rate measurements to generate the sequence of symbols.

As described below with reference to FIG. 2, example systems employ one or more decoders decoder to convert non-identical sequences of symbols generated by the two RF transceivers 120 and 150 that a relatively small number of differences into identical sequences. These decoders apply the sequence of symbols generated from the power level or other measurements to an ECC decoder, such as a Reed-Solomon decoder. The selected decoder may produce common sequences of different complexity based on the selected encryption method. In these embodiments, each of the decoders implements a many-to-one mapping by which multiple sequences of symbols generated from the measurements made by the RF transceivers 120 and 150 map into a common symbol sequence. The number of symbol differences that can be mapped into the same value depends on the Hamming distance of the particular ECC. As described above, an ECC decoder having a sufficiently large Hamming distance may be used to map the sampled sequences to common keys that may be used to generate the cryptographic key as described below.

For cryptographic key creation using the embodiment shown in FIG. 1, the RF transceivers 120 and 150 are concurrently placed in a key creation mode by their respective devices. This may be accomplished, for example, using a non-encrypted communication between the two transceivers. In this non-encrypted communication, the two devices may exchange information on their processing resources, battery status, and the sensitivity of the data to be transferred. In an example system, after exchanging this data, the processors 102 and 152 of the RF transceivers 120 and 150 may select from among three levels of encryption based on the exchanged data. When the data indicates that one of the devices has limited resources and/or battery life as well as data with low sensitivity, the two devices may agree to use simple encryption. When both devices have greater resources and sufficient battery life, the two devices may agree on an intermediate encryption level unless the sensitive data is to be transferred, in which case the two devices may agree on complex encryption.

An example method for determining a level of encryption may classify the resources available to a device into three levels, high, medium, and may classify power levels into three levels, unlimited, long battery life, and short battery life, and may classify the sensitivity of the data being transferred into three levels, non-confidential, confidential, and secret. The RF transceivers may always specify low-level encryption for devices, such as simple IoT devices, having limited resources (e.g., a microcontroller and less than 1 MB of memory) as they are unlikely to convey confidential or secret data. It may also specify low-level encryption for mobile devices that have long or short battery life and that transfer non-confidential information. Intermediate level encryption may be specified for mobile devices that transfer confidential information regardless of their battery life. High level encryption may be specified for devices having unlimited power levels. The attributes of the devices coupled to both of the transceivers are considered in selecting the encryption level. Thus, low-level encryption is specified when a device having unlimited power and a high level of resources communicates with an IoT device having low resource levels. Similarly, intermediate encryption may be specified when the device having unlimited power and the high level of resources communicates with a mobile device having low battery life transfers confidential information and high-level encryption may be specified for devices transferring secret data.

In an example key creation mode, each RF transceiver 120 and 150 may be allocated a predetermined amount of time to receive data including a sequence of predetermined packets (e.g., null packets) and/or an unmodulated RF carrier signal from the other transceiver in order to make multiple power level measurements and generate the sequence. In one example embodiment, each of the RF transceivers sends the predetermined packets and/or the unmodulated carrier signal to the other RF transceiver and either concurrently or subsequently receives corresponding predetermined packets and/or a corresponding unmodulated carrier signal from the other RF transceiver.

Figure 2:
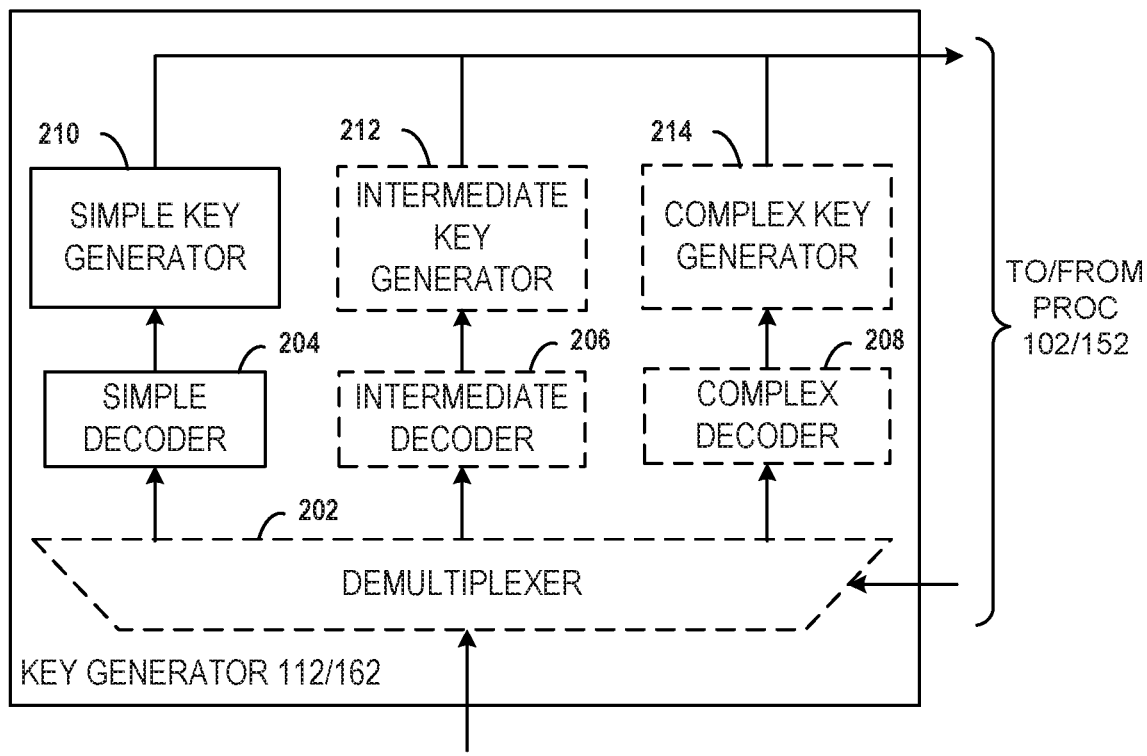
FIG. 2 is a block diagram of a key generator of an RF transceiver according to an example embodiment.

FIG. 2 is a block diagram showing example key generation circuitry that may be used as the key generation circuitry 112 or 162 shown in FIG. 1. The device using the RF transceiver 120 and the device using the transceiver 150 select an encryption method and/or an encryption key to be used based on the sensitivity of the data to be transferred and the resources of the two devices, including their remaining battery life, as described above. Each of the RF transceivers generates the sequence of symbols from the sensed RF power levels or other measurements based on data received via the RF channel 130 as described below with reference to FIGS. 4 and 5. The processor 102 provides the sequence generated from these measurements and data indicating the selected encryption level to a demultiplexer 202. The demultiplexer provides the generated sequence to the one of three decoders 204, 206 and 208, based on the selected encryption level. As described above, each decoder 204, 206, and 208 performs a many-to-one mapping that maps the sequence detected by the RF transceiver 120 into a sequence that matches the sequence used by the RF transceiver 150. The decoder 204 generates a relatively simple sequence, for example, a 64-bit or 128-bit stream. The decoder 206 generates a more complex sequence, for example a 1024-bit stream. The decoder 208 generates an even more complex sequence, for example a 5120 bit-stream representing 1024 5-bit symbols. The decoders 204, 206 and 208 apply their generated sequences to a simple key generator 206, an intermediate key generator 208 and a complex key generator 204, respectively. The length and composition of the sequence is related to the desired level of encryption and the particular encryption technique used.

The example key generation circuitry shown in FIG. 2 is used in a device that has sufficient resources to handle multiple levels of encryption. Although three levels of encryption are shown in FIG. 2, it is contemplated that there may be more levels including multiple different key generators for each level. Other key generation circuits may include fewer encoders and fewer key generators. For example, an IoT device may use a single decoder and a single key generator that, for example, generates a 64-bit DES key from the sequence provided by the decoder 202. In this embodiment, the demultiplexer 202, intermediate decoder 206, complex decoder 208, intermediate key generator 212, and complex key generator 214 may be eliminated, as indicated by the dashed lines. Alternatively, the decoders 206 and 208, the key generators 212 and 214 and the demultiplexer 202 may be implemented in the RF transceiver 120 and/or 150 but the RF transceiver may be configured to route the determined common sequence to only one of the key generators that is appropriate for the device using the key generator circuitry 112/162 and/or the data being exchanged by the device. In another alternative, the system may employ a single key generator but multiple decoders, as described below with reference to FIG. 5. The decoders 204, 206, and 208 may generate keys of different length, for example, the simple decoder 204 may generate a 64-bit key the decoder 206 may generate a 1024-bit key and the decoder 208 may generate a 5120-bit key as 1024 5-bit symbols. These keys may be used by a single encryption/decryption processor to provide different levels of encryption.

In example embodiments, the encryption algorithms are symmetric algorithms in which the same key is used for encryption and decryption. Example simple encryption algorithms include DES, triple DES and advanced encryption standard (AES). Example intermediate encryption algorithms include convolutional encryption, CAST-128, CAST-256, Twofish, or Serpent. Example complex encryption algorithms include elliptic curve encryption and constellation-based encryption which uses the generated sequence to generate a constellation map that, during encryption, uses a key of multi-bit symbols to map smaller symbols (e.g., 1-bit or 2-bit symbols) into larger symbols (e.g., 5-bit or 8-bit) symbols and performs the reverse operation during decryption.

In constellation encryption, the key maps the smaller symbol values into a larger constellation of values, for example, mapping binary or quaternary values (2-bits per symbol) values into a 32 QAM constellation or a 256 QAM constellation. For example, the key may define multiple points in the constellation that correspond to each smaller symbol value. In an example binary implementation, alternate key symbols may correspond to a binary "1" and a binary "0." In this example, each bit of the input binary word is mapped into a pseudo-randomly selected one of the corresponding key symbols to generate the encrypted message. The pseudo-random mapping may be generated by using the common sequence as the seed value for a pseudo-random number generator. The cryptographic key implementing this mapping (e.g., the sequence of pseudo-random numbers) may define a look-up-table (LUT) that maps input symbols into constellation symbols and vice versa. Although the example mapping is pseudo-random, other processes for defining the mapping may be used, such as selection from among a set of predetermined LUTs shared by the RF transceivers 120 and 150.

The RF transceiver 150 creates its sequence of symbols and cryptographic key before, during or after the creation of the creation of the sequence and cryptographic key by the RF transceiver 120. The creation of the sequence and the cryptographic key by the RF transceiver 150 is similar to the creation by the RF transceiver 120 described above.

Figure 3:
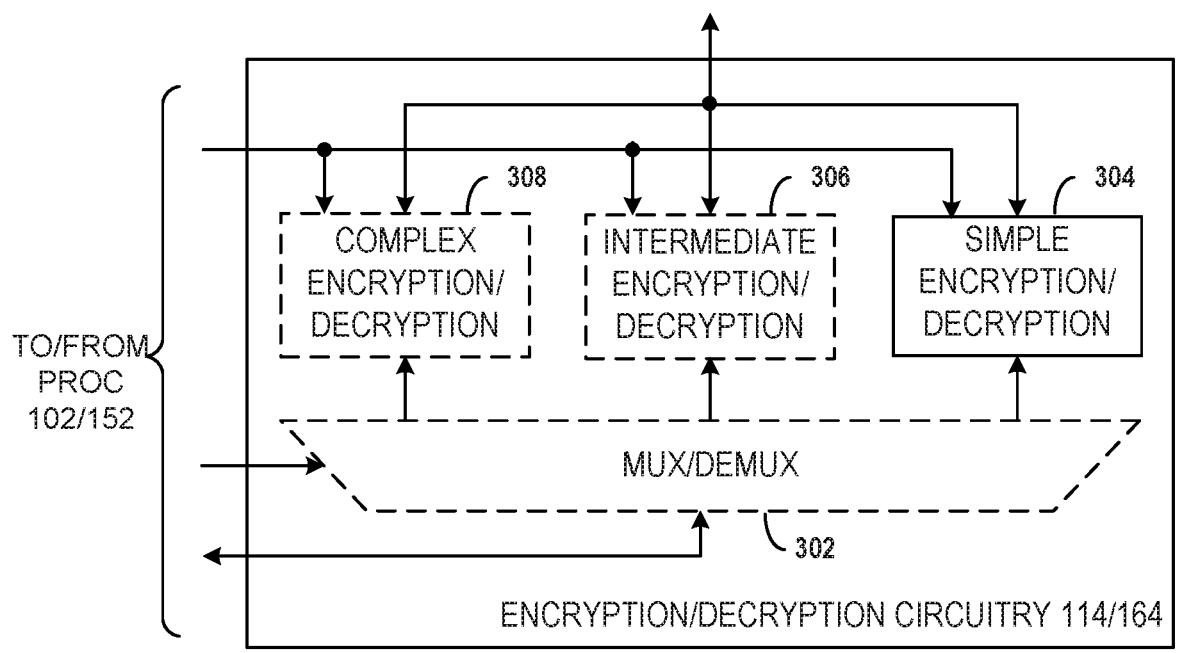
FIG. 3 is a block diagram of an encryption/decryption processor according to an example embodiment.

FIG. 3 is a block diagram of example encryption/decryption circuitry that may be used as the circuitry 114 or 164 shown in FIG. 1. The example circuitry includes a multiplexer/demultiplexer 302, a simple encryption/decryption processor 304, an intermediate encryption/decryption processor 306, and a complex encryption/decryption processor 308. As described above with reference to FIG. 2 and shown by the dashed lines in FIG. 3, the encryption/decryption circuitry 114/116, when implemented in a device such as an IoT device that has limited processing power and/or that transfers relatively insensitive data, may include only the simple encryption/decryption processor 304. Alternatively, the key encryption/decryption processors 306 and 308 as well as the multiplexer/demultiplexer 302 may be implemented in the RF transceiver 120 and/or 150 but the RF transceiver may be configured to route the data to be encrypted or decrypted to only one of the encryption/decryption processors that is appropriate for encrypting and decrypting the data exchanged by the device. The simple encryption/decryption processor 304 may implement a simple algorithm such as DES, triple DES or AES, the intermediate encryption/decryption process 306 may implement an intermediate algorithm such as convolutional encryption CAST-128, CAST-256, Twofish, or Serpent, and the complex encryption/decryption process 308 may implement a complex process such as elliptic curve cryptography or the constellation-based encryption/decryption process described above.

After both of the RF transceivers 120 and 150 have created cryptographic keys, transceiver 120 may encrypt a known data stream, modulate one or more carriers with the encrypted stream and transmit the modulated carrier(s) to the RF transceiver 150. If RF transceiver 150 can decrypt the known data stream using the cryptographic key that it generated in parallel with the key generated by the RF transceiver 120, RF transceiver 150 may send an encrypted or unencrypted acknowledgement signal to the RF transceiver 120 indicating that both keys match. Alternatively, each RF transceiver 120 and 150 may encrypt and send the known data to the other RF transceiver 150 and 120. In this instance, upon successful decoding, each transceiver may store its key and begin to encrypt data using the key without sending an acknowledgement signal. If RF transceiver 150 cannot decrypt the data stream, then the two keys do not match and both RF transceivers 120 and 150 restart the process of generating their respective cryptographic keys.

Once both of the RF transceivers 120 and 150 have generated the same cryptographic key, the two transceivers may exchange encrypted data. For example, the processor 102 of RF transceiver 120 may use the cryptographic key and the encryption/decryption circuitry 114 to encrypt clear data received by the transceiver 120 via the I/O interface 106. The encrypted data may then be applied to the modulator 116 which modulates the one or more carrier signals with the encrypted data to generate a modulated signal which is applied to the RF front end circuitry 108 for transmission to the RF transceiver 150. In RF transceiver 150, the modulator/demodulator 166 receives the modulated signal via the RF front end circuitry 158 and demodulates the received signal. The encryption/decryption circuitry 164 decrypts the demodulated signal using the cryptographic key generated by the key generator 162 to reproduce the clear data that may be provided to external circuitry (not shown) via the I/O interface 156.

Both of the RF transceivers 120 and 150 create the same cryptographic key before exchanging encrypted data. The keys may be created sequentially such that one RF transceiver 120 or 150 creates the cryptographic key before the other RF transceiver 150 or 120. Alternatively, both RF transceivers may create the cryptographic key concurrently such that RF transceiver 120 generates and sends predetermined packets to RF transceiver 150 while RF transceiver 150 generates and sends predetermined packets to RF transceiver 120. These packets may be sent simultaneously if the transceiver supports full duplex communications or may be interleaved such that RF transceiver 120 receives one or more predetermined packets followed by RF transceiver 150 receiving one or more predetermined packets until both RF transceivers have generated M symbols used to create the cryptographic key.

Figure 4:
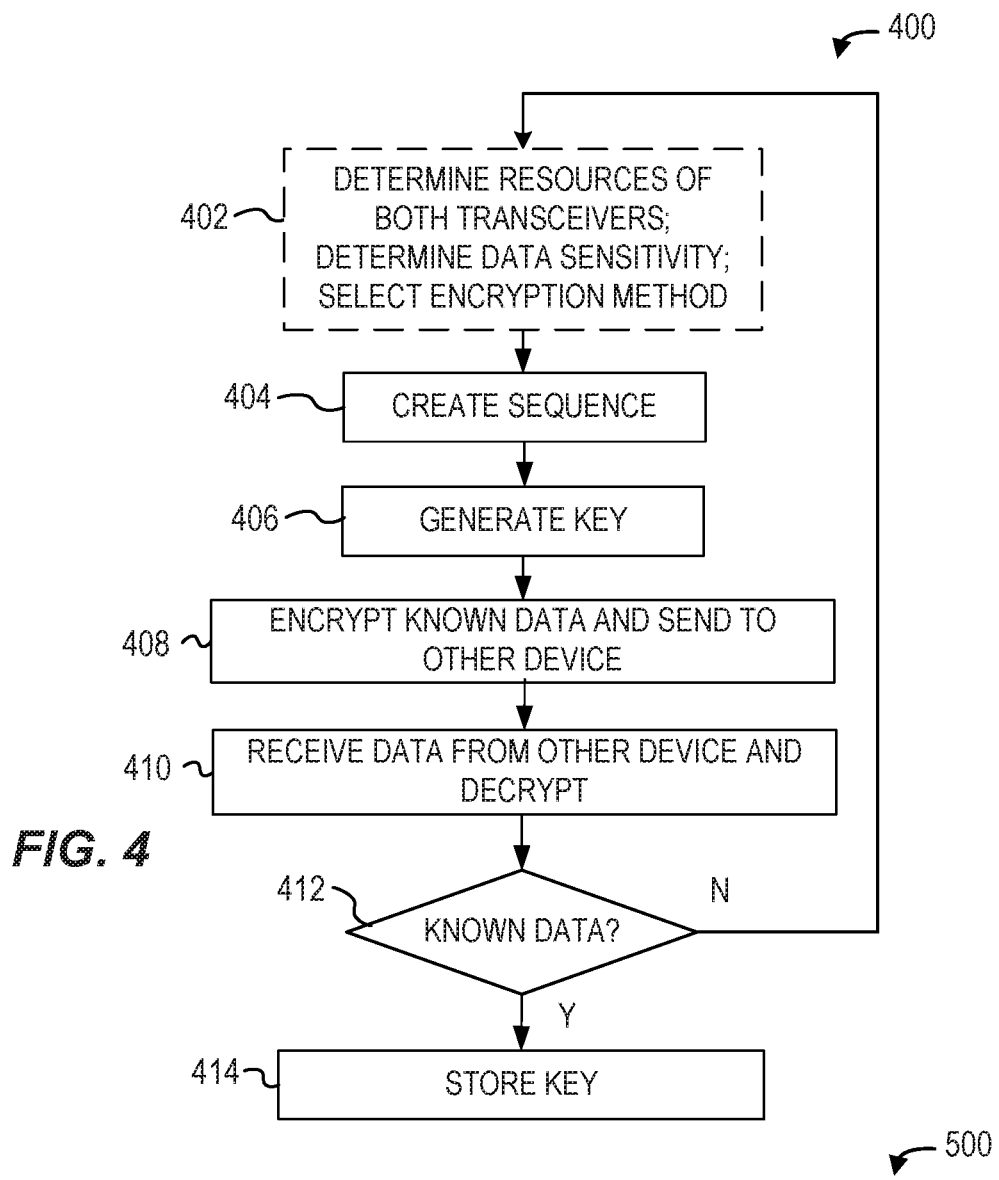
FIGS. 4 and 5 are flow-chart diagrams showing methods for generating a cryptographic key from a set of M symbols.
Figure 5:
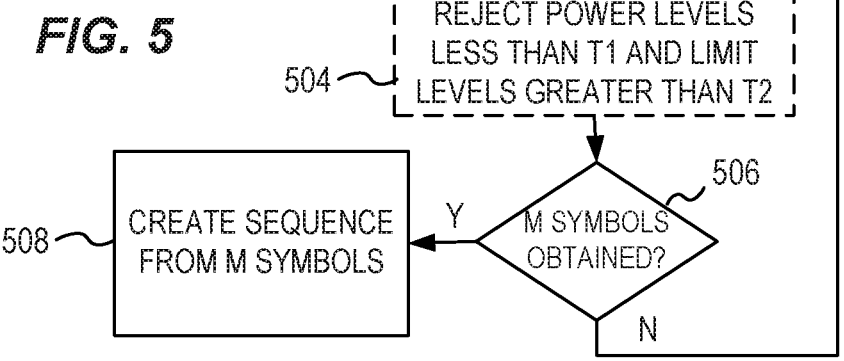

As described above, because the two RF transceivers 120 and 150 create their cryptographic keys independently, the keys may or may not match. FIGS. 4 and 5 are flowchart diagrams showing an example cryptographic key creation process 400 implemented by the RF transceivers 120 and 150, according to example embodiments, to achieve matched keys. FIG. 4 is described in the context of RF transceiver 120. The same operations, however, apply to RF transceiver 150.

At operation 402 of the process 400, the RF transceivers 120 and 150 determine their available resources and data sensitivities and, based on this determination select an encryption method. Once the encryption method is selected, the process 400 at operation 404 creates a sequence of symbols, as described below with reference to FIGS. 5, 6A and 6B. FIG. 4 shows operation 402 using a dashed-line block to indicate that it is an optional operation. As described above, devices, such as IoT devices, having limited processing power and less-sensitive data may employ a single, simple encryption/decryption operation. This device, however, may communicate with a more complex device. In this instance, the more complex device, may identify a level of encryption to use with the simple device from unencrypted packets received from the simple device and may select the simple encryption method accordingly.

After selecting the encryption method and generating the sequence, operation 406 of the process 400 generates the cryptographic key. As shown in FIG. 2, the processor 102 applies the created sequence of symbols to one of the decoders 204, 206, and 208 of the key generation circuitry 112 to generate the common sequence. Each of the decoders may include ECC functions to map the sequences of symbols generated by the two RF transceivers from the RF power level measurements into a sequence that is common to the two RF transceivers 120 and 150. Each decoder 204, 206, and 208 has a corresponding key generator 210, 212, and 214. The selected decoder/key generator then outputs the generated key to the processor 102.

After generating the key, the processor 102, at operation 408, applies the cryptographic key and the indication of the selected encryption method to the encryption/decryption circuitry 114 which encrypts a known data set with the created cryptographic key and provides the encrypted data to the modulator/demodulator circuitry 116. Also at operation 408, the processor 102, controls the modulator/demodulator circuitry 116 to modulate the carrier(s) with the encrypted data set and controls the RF front end 108 to transmit the modulated encrypted data set to the RF transceiver 150. At operation 410 The RF transceiver 120 receives an RF signal from the RF transceiver 150. If the RF transceiver 150 successfully decrypted the data set, the received signal may be an acknowledgement. Alternatively, the received signal may be the known data set encrypted and transmitted by the RF transceiver 150. In this instance, the processor 102 at operation 410 applies the cryptographic key to decode the sampled data signal and compares the result to an internally stored known data set to determine if the decryption was successful.

When the RF transceiver 120 receives the acknowledgement signal or, at operation 412, is able to decrypt the known data, the cryptographic keys generated by the transceivers 120 and 150 match and, at operation 414, the processor 102 stores the generated key in the memory 104. At operation 412, if the cryptographic keys do not match, control transfers to operation 402 to restart the process of generating the cryptographic key.

FIG. 5 is flowchart diagrams that describe examples of a process 500 that implements the operation 402 to generate the sequence. The generation of the sequence of symbols and, thus, the creation of the cryptographic key by the two RF transceivers 120 and 150 may be synchronized according a protocol known to both of the transceivers 120 and 150 or communicated between the transceivers 120 and 150 prior to generating the sequence and the cryptographic key. Alternatively, the RF transceivers 120 and 150 may be synchronized based on a common received signal, for example from the time synchronization circuits 118 and 168 in the transceivers 120 and 150. This protocol may also include data to synchronize clock signals in the two optical transceivers to enable each of the transceivers to transmit and receive the packets during intervals in which the other transceiver receives and transmits predetermined packets, respectively. At operation 502 of FIG. 5, processor 102 of the RF transceiver 102 measures power levels of N packets received from the RF transceiver 150. As described other measurements, such as packet latency or packet bit error rate, that are influenced by the channel 130 between the RF transceivers 120 and 150 may be used instead of the power level measurements. The number N is determined, at least in part, by the selected level of encryption. A simple encryption method may specify a relatively small value for N to generate a relatively short sequence of symbols while a complex encryption method may specify a relatively large value for N to generate a longer sequence of symbols. Furthermore, the decoders typically reduce the number of symbols and this reduction is greater for decoders having greater Hamming distance, Thus, the selection of the decoder may also influence the value of N.

As described above, the power measurement may be a RSSI, RCPI or other power level measurement indicating received power of signals from the RF transceiver 150. At operation 504, the process 400 optionally rejects any power level values that are greater than a threshold T1 and/or less than a threshold T2. As an alternative to using the thresholds, example embodiments may select only certain bits of each measurement as a symbol to use to create the sequence. As described above, depending on the type of sequence being generated, operation 504 may retain or ignore zero-valued power level values.

For some sequences, it may not be desirable to have strings of zero-valued symbols occurring at regular intervals in the sequence. These strings of zero-valued symbols may occur, for example, when the sequence is generated by sampling the RF signal using the sampler/ADC circuitry 110 and the received power levels are relatively low compared to the range of values processed by the ADC. For examples, the power levels may be in a range from 0 to 2 V but may be quantized by an ADC having a range from 0 to 16 V. In this embodiment, operation 540 may delete the three most significant bits (MSBs) and the three least significant bits (LSBs) to provide 10-bit symbol values. At higher power levels, for example when the received power level values span the full range from 0 to 16 V, operation 504 may delete the six LSBs of each power level value to still produce 10-bit symbols. At operation 506, the process 500 determines whether at least M symbols have been obtained. If they have not, process 500 transfers control to operation 502 to obtain N more power level values. When at least M symbols have been obtained at operation 506, operation 508 creates the sequence from the M symbols.

The N power level values measured in operation 502 of FIG. 5 may be measured by the RF transceiver 120 in a group or concurrently with the N power level measurements made by the RF transceiver 150. In one embodiment, during operation 502, each transceiver 120 and 150 may transmit N predetermined packets (e.g., null packets) to the other transceiver. These packets may be transmitted sequentially, or they may be interleaved such that each transceiver 120 and 150 transmits one or more packets in a frame time until each transceiver has transmitted and received N packets. As described above, it may be desirable to interleave the packet transmissions so that the packets received by both RF transceivers are subject to similar channel conditions.

The numbers N and M depend on the desired size of the sequence which, in turn, depends on the selected encryption level and type. For example, to create a 1024-bit sequence for a AES system the process 500 may need to generate 103 10-bit symbols from the power level measurements. In the example shown in FIG. 5, N may have a value of 10 or more and M may have a value of 110 so that at least 11 iterations through the loop of the process 500 produce the desired number of symbols. In another embodiment, the symbol size may be 10 bits, N may be 1 and M may be 13, for example, to create a 128-bit sequence that may be used, for example, in a DES encoder.

In some embodiments, a single algorithm may be used to generate keys of different complexity. The generated keys may be binary keys for use with simple encryption algorithm such as DES or ADE or an intermediate encryption algorithm, such as convolutional encryption, or multi-bit symbol keys for use with a complex encryption algorithm such as constellation encryption. Using this algorithm, the key generator generates a sequence of M binary values, as described above with reference to FIG. 5. The M binary values are then partitioned into a sequence of alphabet size q, such that each symbol has a number of bits equal to log 2($\lceil q \rceil$), where $\lceil q \rceil$ is the smallest integer greater than or equal to q. The length of the resultant key is int(M/log 2($\lceil q \rceil$)), where int(x) represents the integer part of the value x. For example, if M=128 and q=4, the result would be a 64-symbol key where each symbol is 2-bits in length. The values of M and q may be determined based on the desired complexity of the key. For example, for DES encryption using a 64-bit binary key, M is 64 and q is for a constellation encryption key having 128 5-bit symbols, M=640 and q=32. As described above, the value of q or the values of both M and q may be selected based on the smallest level of computing resources (e.g., low, medium, or high) available to the transceivers, the lower remaining battery power of the two devices (e.g., low, medium, or high) and/or the sensitivity of the data being encrypted (e.g., non-confidential, confidential, or secret). The determination of the remaining battery power may also be implemented by comparing the battery lifetime of each of the devices to one or more threshold values and selecting the encryption method based on the lower lifetime.

Figure 6A:
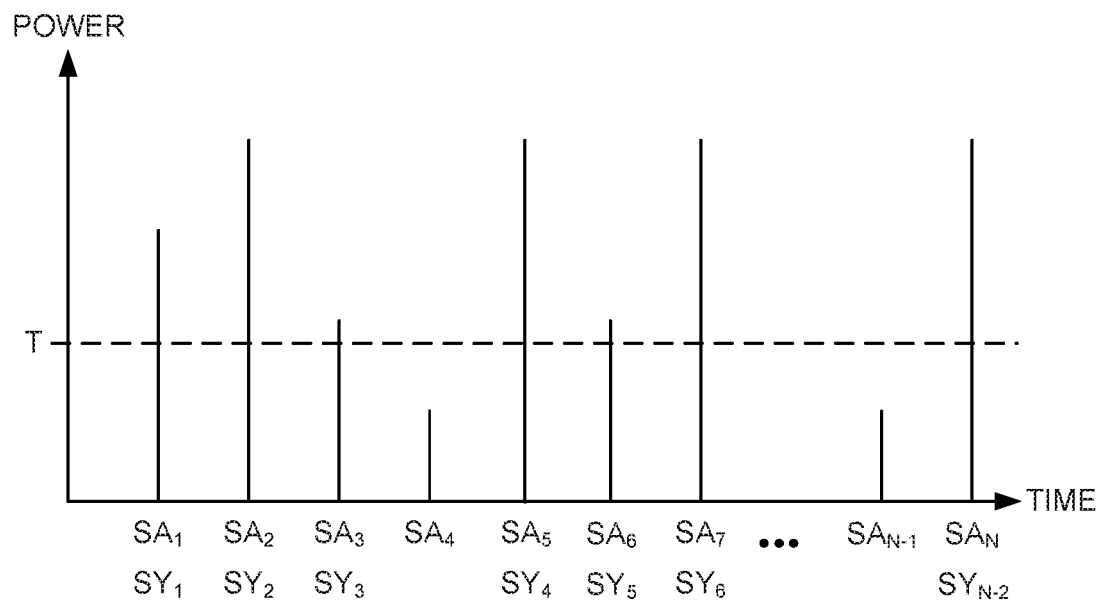
FIGS. 6A and 6B are graphs of power versus time that are useful for describing example embodiments.
Figure 6B:
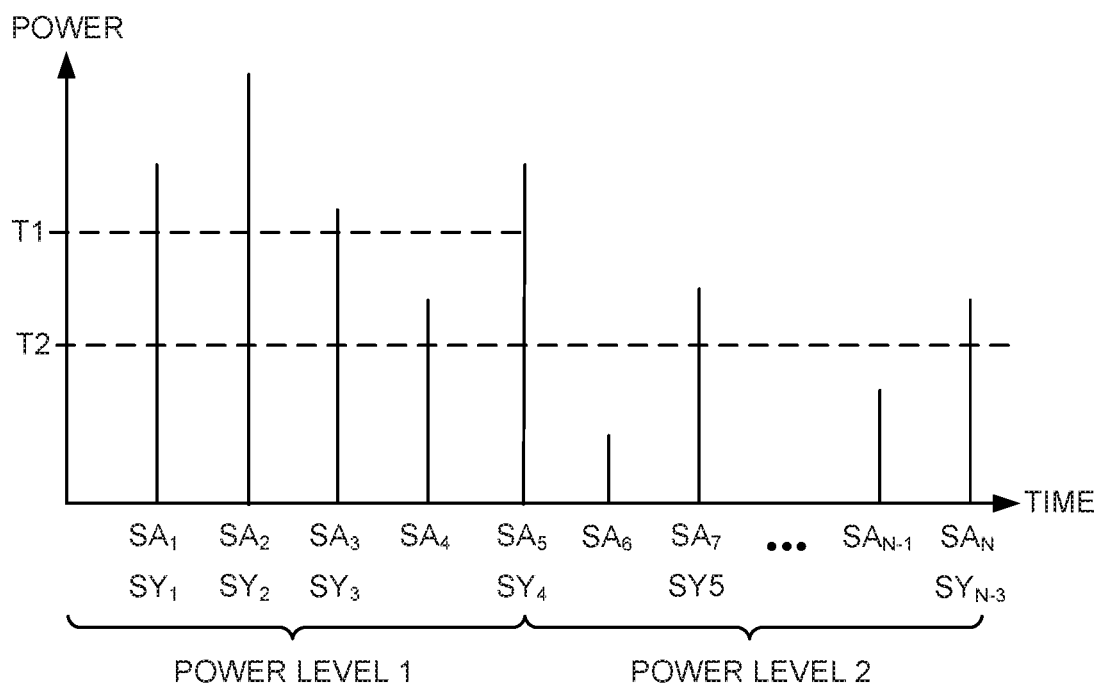

FIGS. 6A and 6B are graphs of signal power versus time showing sampling operations performed in the example RF transceivers 120 and 150. FIGS. 6A and 6B show example sampling of respective power-level signals received at transceiver 120 of FIG. 1, $SA_1$, $SA_2$, $SA_3$, $SA_4$, $SA_5$, $SA_6$, $SA_7$, ..., $SA_{N-1}$, and $SA_N$ are quantized samples generated by sampler/ADC 110 or the digital power levels provided by the RF front end circuitry 108 at intervals shown along the horizontal time axis. The labels $SY_1$, $SY_2$, $SY_3$, $SY_4$, $SY_5$, $SY_6$, ..., and $SY_{N-2}$ below the respective samples $SA_1$, $SA_2$, $SA_3$, $SA_5$, $SA_6$, ..., and $SA_N$ indicate the respective N–2 symbols generated from the N quantized samples. As described above, in one example, the quantized samples may be 16-bit values while the symbols may be 10-bit values derived from respective ones of the quantized samples.

In one example, each quantized sample is a bit string that indicates the value of a power level indicated by the height of the quantized sample as shown by the vertical power axis. The relative heights of the quantized samples are exaggerated in FIGS. 6A and 6B to illustrate operation of the embodiment. Alternatively, the relative heights of the quantized samples may represent digitized values produced by the ADC of the sampler/ADC 110 implementing a non-linear transfer function that assigns more quantization levels to higher power levels than to lower power levels, enhancing differences among the higher power samples while reducing differences among lower power samples.

In the scenario shown in FIG. 6A, the sampler/ADC 110 of the RF transceiver 120 receives an RF signal transmitted by the RF transceiver 150 at a single power level. The horizontal line T represents a threshold value. As described above, the transceivers may ignore the quantized samples having values less than the threshold T when generating the output symbols used to create the sequence. As shown in FIG. 6A, samples $SA_4$ and $SA_{N-1}$ have values less than the threshold T and are ignored so that the key generator 112 of the RF transceiver 110 generates symbols $SY_1$, $SY_2$, $SY_3$, $SY_4$, $SY_5$, $SY_6$, and $SY_{N-2}$, corresponding to the respective samples, $SA_1$, $SA_2$, $SA_3$, $SA_5$, $SA_6$, $SA_7$ and $SA_N$. For example, this key may be generated as described above with reference to FIG. 5 and the algorithm that translates the M binary symbols into a key having a length of int(M/log 2($\lceil q \rceil$)).

The scenario shown in FIG. 63 illustrates an example in which the detected power levels of the packets provided by the RF transceiver 150 change between power level 1 and power level 2. Quantized samples $SA_1$, $SA_2$, $SA_3$, and $SA_4$ represent samples received at power level 1 while samples $SA_5$, $SA_7$, ..., $SA_{N-1}$, and $SA_N$ represent samples received at power level 2, where power level 2 is lower than power level 1. The embodiment illustrated by FIG. 6B shows two threshold values, T1 and T2. In this embodiment, T1 is used for quantized samples $SA_1$, $SA_2$, $SA_3$, and $SA_4$ while T2 is used for quantized samples $SA_5$, $SA_6$, $SA_7$, ..., $SA_{N-1}$, and $SA_N$. As shown in FIG. 6B, quantized sample $SA_4$ is less than T1 and quantized samples $SA_6$ and $SA_{N-1}$ are less than T2. Accordingly, these samples are ignored and no corresponding symbols are generated. Thus, in the scenario shown in FIG. 6B, the processor 102 of the RF transceiver 120 generates N–3 symbols $SY_1$, $SY_2$, $SY_3$, $SY_4$, $SY_5$, ..., and $SY_{N-3}$ from the N quantized samples $SA_1$, $SA_2$, $SA_3$, $SA_4$, $SA_5$, $SA_6$, $SA_7$, ..., $SA_{N-1}$, and $SA_N$. As described above, when generating the symbols from the quantized samples, the processor 102 may subtract the threshold value from the quantized samples (e.g., delete the LSBs corresponding to the threshold). Furthermore, the processor 212 may delete the MSBs of the quantized symbols that are expected to be zero-valued based on the current power level.

Figure 7:
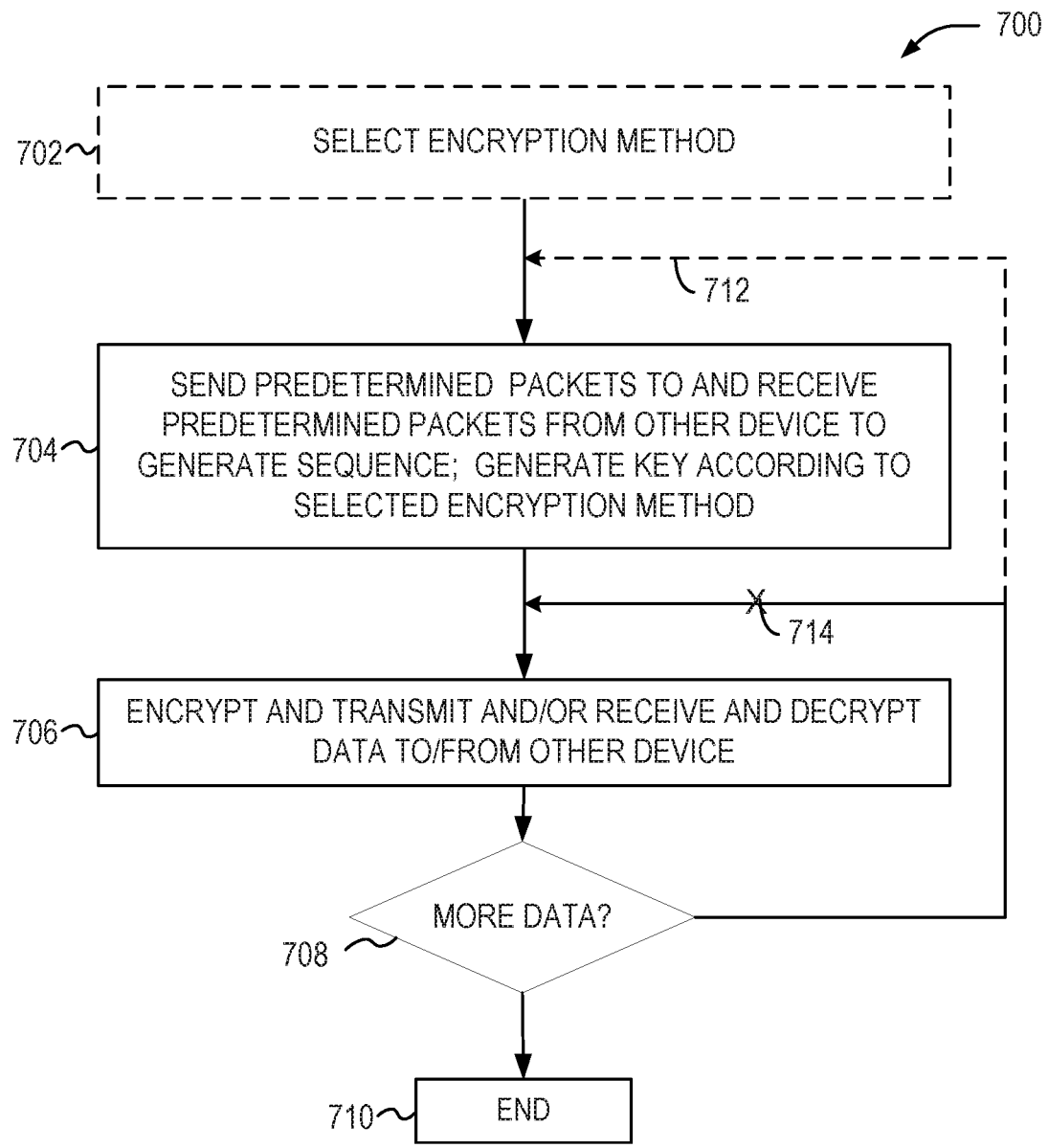
FIG. 7 is a flow-chart diagram showing a process for transferring data according to example embodiments.

FIG. 7 is a flow-chart diagram of a process 700 used by one of the RF transceivers 120 and/or 150 to independently generate one or more common cryptographic keys and exchange data encrypted with the common cryptographic keys. At operation 702, the process 700 selects the encryption method, as described above with reference to operation 404 of FIG. 4. This operation is optional as, for some devices, the encryption method may be predetermined based on the resources available to one or more of the devices exchanging data and the sensitivity of the data being exchanged. At operation 704, the RF transceivers 120 and 150 send and receive predetermined packets to and from the other transceiver, generate the common sequence, and generate a cryptographic key for the selected encryption method, as described above. At operation 706, the RF transceivers 120 and 150 encrypt and transmit and/or receive and decrypt data to/from the RF transceivers 150 and 120, respectively. At operation 708, the process 700 determines whether there is more data to be exchanged. When there is more data to be exchanged, the process 700 may branch either to operation 706 to use the same common cryptographic key to send the data or may branch to operation 704, as indicated by the dashed line 712, to determine a new cryptographic key and use the new cryptographic key to transmit and/or receive the additional data. When the process 700 branches to operation 704, the branch to operation 706 is de-implemented, as indicated by the "X" 714. When, at operation 708, there is no more data to be exchanged, the process 700 ends at operation 710. Generating a new cryptographic key before sending each data set adds an extra layer of protection to the encrypted data making it more difficult for an eavesdropper to decrypt the data even when the two RF transceivers use relatively low-level encryption.

Figure 8:
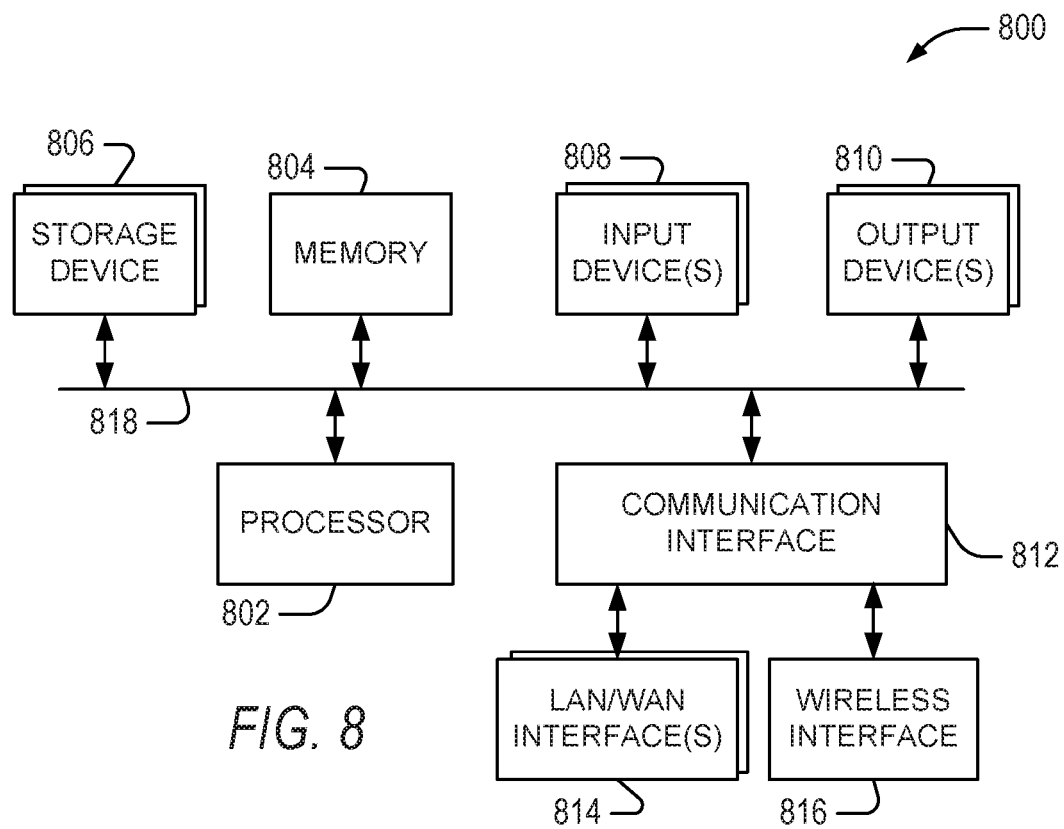
FIGS. 8 and 9 are block diagrams of example hardware that may be used in example embodiments.

FIG. 8 is a block diagram of an example processing system 800 that may be used in or with one or more of the RF transceivers 120 and 150 shown in FIG. 1 when the transceiver is a part of a server-based device. In these examples, the key generation circuitry 112/162 and the encryption/decryption circuitry 114/164 may be implemented as software modules running on the processing system 800. Alternatively, the system 800 may be separate from the RF transceiver 120 or 150 and may provide data to and/or receive data from the RF transceiver via the I/O interface 106 or 156.

The system 800 includes a processor 802 coupled to a bus 818. Also coupled to the bus 818 are a memory 804, which may include a flash memory device, random access memory (RAM) and/or read only memory (ROM); a mass storage device 806, such as a RAID disk array and/or a solid-state disk, one or more input devices 808, such as a keyboard or a pointing device; and one or more output devices 810, such as a display screen. The memory 804 may store computer instructions for applications that are currently running on the system 800.

The bus 818 also connects the system 800 to a communication interface 812, for example, to provide communication between the system 800 and a wireless network including the RF channel 130, shown in FIG. 1. The communications interface 812 may also be coupled to a LAN/WAN interface 814 such as a wired or optical Ethernet connection to allow the device including the RF transceiver to communicate with other devices over a wired network connection. In addition, the communication interface may be coupled to a wireless interface 816. The connection established using the wireless interface 816 includes the RF channel 130 shown in FIG. 1. The interfaces 814 and 816 may be coupled to respective transceivers and/or modems (not shown) to implement the data communications operations.

Processor 802 may include a single-core or multi-core microprocessor, a microcontroller, and/or a digital signal processor (DSP) configured to execute commands stored in the memory 804 corresponding to the programs (Internet browsers, application program interfaces (APIs), dynamically linked libraries (DLLs), or applications (APPS)) and/or to the algorithms described above. The memory 804 may also store temporary variables, a clipboard, or other information used in the execution of these programs. The programs stored in the memory 804 may be retrieved by the processor from a separate computer readable medium, for example, a flash memory device, a CD-ROM, or digital versatile disk (DVD).

Figure 9:
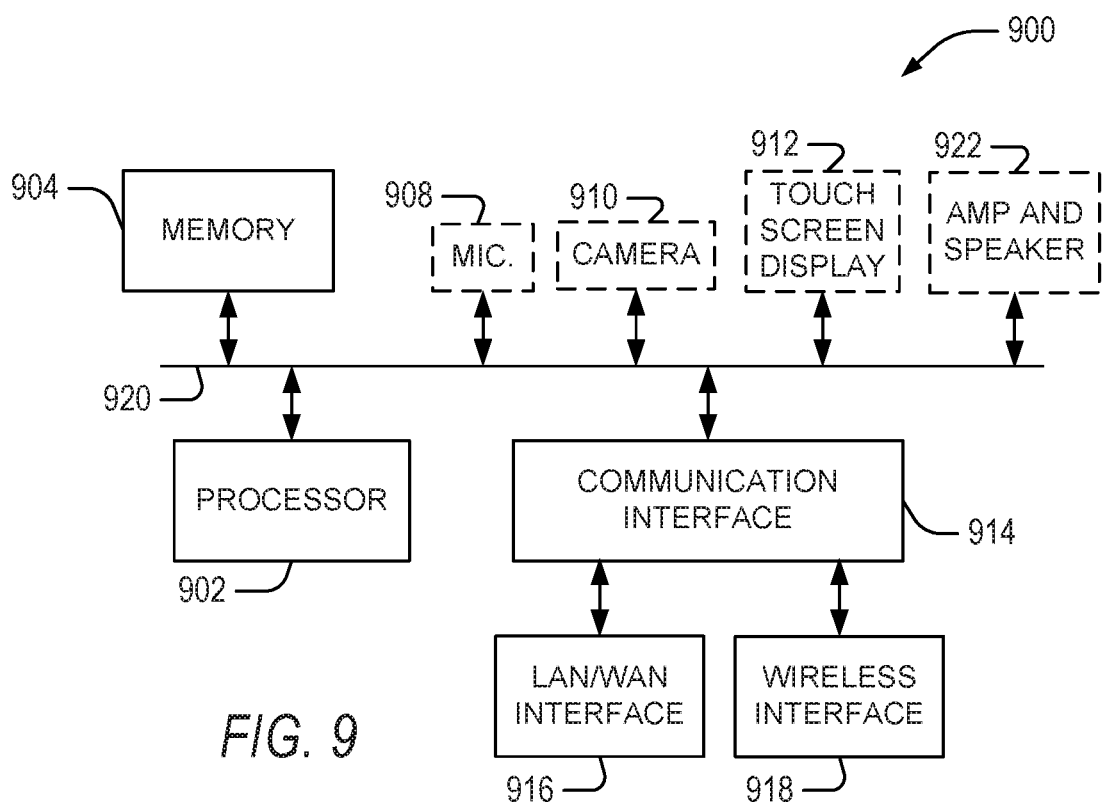

FIG. 9 is a block diagram of an alternative processing system 900 that may be used in or with one of the RF transceivers 120 or 150 shown in FIG. 1. The processing system 900 may be, for example, IoT device, a smart phone, tablet computer, personal computer, and/or a smart speaker. The system 900 includes a processor 902 coupled to a bus 920. Also coupled to the bus 920 are a memory 904, which may include a flash memory device, random access memory (RAM) and/or read only memory (ROM); an optional microphone 908; an optional camera 910; an optional input and/or output device 912, such as a touch screen display; and an optional amplifier and speaker 922. The bus 920 also connects the system 900 to a communication interface 914, for example, to provide communication with another device including an RF transceiver such as the RF transceivers 120 and 150 shown in FIG. 1. It is contemplated that the amplifier and speaker 922 may be coupled directly to an analog output port of the processor 902 rather than to the bus 920.

The memory 904 may store computer instructions for applications that are currently running on the system 900. The communications interface 914 may be coupled to a LAN/WAN interface 916 such as a wired or optical Ethernet connection or other network connection through which the system 900 may communicate with other devices in a network. In addition, the communications interface 914 may be coupled to a wireless interface 918 which may communicate with other devices, including communicating with another RF transceiver via the RF channel 130, shown in FIG. 1. The interfaces 916 and 918 may be coupled to respective transceivers and/or modems (not shown) to implement the data communications operations.

Processor 902 may include a single-core or multi-core microprocessor, a microcontroller, and/or a digital signal processor (DSP) configured to execute commands stored in the memory 904 corresponding to the programs (Internet browsers, application program interfaces (APIs), dynamically linked libraries (DLLs), or applications (APPS)) as well as the algorithms described above. The memory 904 may also store temporary variables, a clipboard, or other information used in the execution of these programs. The programs stored in the memory 904 may be retrieved by the processor from a separate computer readable medium, for example, a flash memory device, a CD-ROM, or digital versatile disk (DVD).

The example embodiments disclosed herein may be described in the general context of processor-executable code or instructions stored on memory that may comprise one or more computer readable storage media (e.g., tangible non-transitory computer-readable storage media). As should be readily understood, the terms "computer-readable storage media" or "non-transitory computer-readable media" include the media for storing of data, code and instructions, such as memory 214, 264, and do not include portions of the media for storing transitory propagated or modulated data communication signals.

Example 1 is an encryption apparatus for a first radio frequency (RF) transceiver comprising: RF front-end circuitry; a memory including instructions; a processor coupled to the memory and the RF front-end circuitry, the processor being configured by the instructions to: determine characteristics of a second RF transceiver configured to communicate with the first RF transceiver; select a level of encryption based on characteristics of the first RF transceiver and the determined characteristics of the second RF transceiver; generate a common sequence of M symbols based on the selected encryption level and signals received from the second RF transceiver, where M is an integer; create a cryptographic key based upon the common sequence; encrypt a message with the cryptographic key; and send the encrypted message to the second RF transceiver.

In Example 2, the subject matter of Example 1 includes, the processor configured to select the encryption level from a plurality of encryption levels including a relatively low level of encryption and a relatively high level of encryption, wherein the generated sequence when the relatively low level of encryption is selected is shorter than the generated sequence when the relatively high level of encryption is selected.

In Example 3, the subject matter of Examples 1-2 includes, the instructions that configure the processor to generate the cryptographic key based on the common sequence including instructions that configure the processor to: determine a value q and the value of M based on the selected level of encryption, wherein q is an integer representing an alphabet size for the common sequence; generate int(M/log 2($\lceil q \rceil$)) symbols from the common sequence by dividing the common sequence into successive symbols, each symbol having log 2($\lceil q \rceil$) bits, wherein the int(M/log 2($\lceil q \rceil$)) symbols form the generated encryption key.

In Example 4, the subject matter of Examples 1-3 includes, the instructions that configure the processor determine the characteristics of the second RF transceiver configuring the processor to receive data from the second RF transceiver including the characteristics of the second RF transceiver.

In Example 5, the subject matter of Examples 1-4 wherein the characteristics of the first and second RF transceivers include information identifying computing resources available to the first and second RF transceivers.

In Example 6, the subject matter of Examples 1-5 wherein the characteristics of the first and second RF transceivers include information identifying remaining battery power of at least one of the first and second RF transceivers.

In Example 7, the subject matter of Examples 1-6 includes, wherein the instructions further configure the processor to: receive an indication of a level of sensitivity of data to be exchanged with the second RF transceiver; and; select the level of encryption based on the sensitivity of the data and the characteristics of the first and second RF transceivers.

In Example 8, the subject matter of Examples 1-7 includes, wherein: the instructions further configure the processor to select the encryption level from a plurality of encryption levels including a relatively low level of encryption, an intermediate level of encryption, and a relatively high level of encryption; the relatively low level of encryption is selected from a group consisting of data encryption standard (DES), triple DES, and advanced encryption standard (AES); the intermediate level of encryption is selected from a group consisting of convolutional encryption, Twofish encryption, CAST-128 encryption, CAST-256 encryption, or Serpent encryption; and the relatively high level of encryption is selected from a group consisting of constellation encryption and elliptic curve encryption.

In Example 9, the subject matter of Examples 1-8 includes, time synchronization circuitry configured to synchronize the first RF transceiver to the second RF transceiver; wherein, to generate the sequence of symbols, the instructions further configure the processor to: receive, responsive to the time synchronization circuitry, data from the second RF transceiver; measure a plurality of power levels of the received data at a respective plurality of instants during the reception of the data; and generate the sequence of symbols from the measured plurality of power levels.

In Example 10, the subject matter of Examples 1-9 includes, wherein the data includes a plurality of predetermined packets and the power levels include at least one of received signal strength indication (RSSI) or received channel power indication (RCPI).

Example 11 is a method for encrypting communications between a first radio frequency (RF) transceiver and a second RF transceiver, the method comprising: determining, by the first RF transceiver, characteristics of the second RF transceiver; selecting a level of encryption based on characteristics of the first RF transceiver and the determined characteristics of the second RF transceiver; generating a common sequence of M symbols based on the selected encryption level and signals received from the second RF transceiver, where M is an integer; creating a cryptographic key based upon the common sequence; encrypting a message with the cryptographic key; and sending the encrypted message to the second RF transceiver.

In Example 12, the subject matter of Example 11 includes, selecting the encryption level from a plurality of encryption levels including a relatively low level of encryption and a relatively high level of encryption; and generating the sequence having a length proportional to the selected level of encryption.

In Example 13, the subject matter of Examples 11-12 includes, determining a value q and the value of M based on the selected level of encryption, wherein q is an integer representing an alphabet size for the common sequence; generating int(M/log 2($\lceil q \rceil$)) symbols from the common sequence by dividing the common sequence into successive symbols, each symbol having log 2($\lceil q \rceil$) bits; and generating the common sequence from the int(M/log 2($\lceil q \rceil$)) symbols.

In Example 14, the subject matter of Examples 11-13 the determining of the characteristics of the second RF transceiver includes determining computing resources available to the second RF transceiver; and the selecting of the level of encryption includes selecting the level of encryption based on computing resources available to the first RF transceiver and the determined computing resources available to the second RF transceiver.

In Example 15, the subject matter of Examples 11-14 the determining of the characteristics of the second RF transceiver includes determining remaining battery power available to the second RF transceiver; and the selecting of the level of encryption includes selecting the level of encryption based on at least one of remaining battery power of the first RF transceiver and the remaining battery power of the second RF transceiver.

In Example 16, the subject matter of Examples 11-15 includes, synchronizing the first RF transceiver to the second RF transceiver; generating the sequence of symbols by: receiving data from the second RF transceiver; measuring a plurality of power levels of the received data at a respective plurality of instants during the reception of the data; and generating the sequence of symbols from the measured plurality of power levels.

Example 17 is an apparatus for encrypting communications between a first radio frequency (RF) transceiver and a second RF transceiver, the apparatus comprising: means for determining characteristics of the first and second RF transceivers; means for selecting a level of encryption based on characteristics of the first and second RF transceivers; means for generating a common sequence of M symbols based on the selected encryption level and signals received from the second RF transceiver, where M is an integer; means for creating a cryptographic key based upon the common sequence; means for encrypting a message with the cryptographic key; and means for sending the encrypted message to the second RF transceiver.

In Example 18, the subject matter of Example 17 includes, means for selecting the encryption level from a plurality of encryption levels including a relatively low level of encryption and a relatively high level of encryption; and means for generating the sequence having a length proportional to the selected level of encryption.

In Example 19, the subject matter of Examples 17-18 includes, means for determining a value q and the value of M based on the selected level of encryption, wherein q is an integer representing an alphabet size for the common sequence; means for generating int(M/log 2(⌈q⌉)) symbols from the common sequence by dividing the common sequence into successive symbols, each symbol having log 2(⌈q⌉) bits; and means for generating the common sequence from the int(M/log 2(⌈q⌉)) symbols.

In Example 20, the subject matter of Examples 17-19 the means for determining the characteristics of the first and second RF transceivers includes means for determining computing resources available to the first and second RF transceivers; and the means for selecting of the level of encryption includes means for selecting the level of encryption based on computing resources available to the first and second RF transceivers.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An encryption apparatus for a first radio frequency (RF) transceiver comprising:
   RF front-end circuitry;
   a memory including instructions;
   a processor coupled to the memory and the RF front-end circuitry, the processor being configured by the instructions to:
     determine characteristics of a second RF transceiver configured to communicate with the first RF transceiver;
     select a level of encryption based on characteristics of the first RF transceiver and the determined characteristics of the second RF transceiver;
     generate, using a decoder, a common sequence of M symbols based on the selected encryption level and signals received from the second RF transceiver, where M is an integer, the common sequence of M symbols configured to be identical to a sequence generated by the second RF transceiver, wherein the signals received from the second RF transceiver differ from signals sent by the second RF transceiver;
     create a cryptographic key based upon the common sequence;
     encrypt a message with the cryptographic key; and
     send the encrypted message to the second RF transceiver.

2. The encryption apparatus of claim 1, wherein the processor is configured by the instructions to select the encryption level from a plurality of encryption levels including a relatively low level of encryption and a relatively high level of encryption, wherein the generated sequence when the relatively low level of encryption is selected is shorter than the generated sequence when the relatively high level of encryption is selected.

3. The encryption apparatus of claim 1, wherein the instructions that configure the processor to generate the cryptographic key based on the common sequence include instructions that configure the processor to:
 determine a value q and the value of M based on the selected level of encryption, wherein q is an integer representing an alphabet size for the common sequence;
 generate int(M/log 2([q])) symbols from the common sequence by dividing the common sequence into successive symbols, each symbol having log 2([q]) bits, wherein the int(M/log 2([q])) symbols form the generated encryption key.

4. The encryption apparatus of claim 1, wherein instructions that configure the processor determine the characteristics of the second RF transceiver configure the processor to receive data from the second RF transceiver including the characteristics of the second RF transceiver.

5. The encryption apparatus of claim 1, wherein the characteristics of the first and second RF transceivers includes information identifying computing resources available to the first and second RF transceivers.

6. The encryption apparatus of claim 1, wherein the characteristics of the first and second RF transceivers includes information identifying remaining battery power of at least one of the first and second RF transceivers.

7. The encryption apparatus of claim 1, wherein the processor is further configured by the instructions to:
 receive an indication of a level of sensitivity of data to be exchanged with the second RF transceiver; and
 select the level of encryption based on the sensitivity of the data and the characteristics of the first and second RF transceivers.

8. The encryption apparatus of claim 1, wherein:
 the processor is configured by the instructions to select the encryption level from a plurality of encryption levels including a relatively low level of encryption, an intermediate level of encryption, and a relatively high level of encryption;
 the relatively low level of encryption is selected from a group consisting of data encryption standard (DES), triple DES, and advanced encryption standard (AES);
 the intermediate level of encryption is selected from a group consisting of convolutional encryption, Twofish encryption, CAST-128 encryption, CAST-256 encryption, or Serpent encryption; and
 the relatively high level of encryption is selected from a group consisting of constellation encryption and elliptic curve encryption.

9. The encryption apparatus of claim 1, further comprising:
 time synchronization circuitry configured to synchronize the first RF transceiver to the second RF transceiver;
 wherein, to generate the sequence of symbols, the processor is further configured by the instructions to:
  receive, responsive to the time synchronization circuitry, data from the second RF transceiver;
  measure a plurality of power levels of the received data at a respective plurality of instants during the reception of the data; and
  generate the sequence of symbols from the measured plurality of power levels.

10. The encryption apparatus of claim 9, wherein the data includes a plurality of predetermined packets and the power levels include at least one of received signal strength indication (RSSI) or received channel power indication (RCPI).

11. A method for encrypting communications between a first radio frequency (RF) transceiver and a second RF transceiver, the method comprising:
 determining, by the first RF transceiver, characteristics of the second RF transceiver;
 selecting a level of encryption based on characteristics of the first RF transceiver and the determined characteristics of the second RF transceiver;
 generating, using a decoder, a common sequence of M symbols based on the selected encryption level and signals received from the second RF transceiver, where M is an integer, the common sequence of M symbols configured to be identical to a sequence generated by the second RF transceiver, wherein the signals received from the second RF transceiver differ from signals sent by the second RF transceiver;
 creating a cryptographic key based upon the common sequence;
 encrypting a message with the cryptographic key; and
 sending the encrypted message to the second RF transceiver.

12. The method of claim 11, further comprising:
 selecting the encryption level from a plurality of encryption levels including a relatively low level of encryption and a relatively high level of encryption; and
 generating the sequence having a length proportional to the selected level of encryption.

13. The method of claim 11, further comprising:
 determining a value q and the value of M based on the selected level of encryption, wherein q is an integer representing an alphabet size for the common sequence;
 generating int(M/log 2([q])) symbols from the common sequence by dividing the common sequence into successive symbols, each symbol having log 2([q]) bits; and
 generating the common sequence from the int(M/log 2([q])) symbols.

14. The method of claim 11, wherein:
 the determining of the characteristics of the second RF transceiver includes determining computing resources available to the second RF transceiver; and
 the selecting of the level of encryption includes selecting the level of encryption based on computing resources available to the first RF transceiver and the determined computing resources available to the second RF transceiver.

15. The method of claim 11, wherein:
 the determining of the characteristics of the second RF transceiver includes determining remaining battery power available to the second RF transceiver; and
 the selecting of the level of encryption includes selecting the level of encryption based on at least one of remaining battery power of the first RF transceiver and the remaining battery power of the second RF transceiver.

16. The method of claim 11, further comprising:
 synchronizing the first RF transceiver to the second RF transceiver;
 generating the sequence of symbols by:
  receiving data from the second RF transceiver;
  measuring a plurality of power levels of the received data at a respective plurality of instants during the reception of the data; and
  generating the sequence of symbols from the measured plurality of power levels.

17. An apparatus for encrypting communications between a first radio frequency (RF) transceiver and a second RF transceiver, the apparatus comprising:
- means for determining characteristics of the first and second RF transceivers;
- means for selecting a level of encryption based on characteristics of the first and second RF transceivers;
- means for generating, using a decoder, a common sequence of M symbols based on the selected encryption level and signals received from the second RF transceiver, where M is an integer, the common sequence of M symbols configured to be identical to a sequence generated by the second RF transceiver, wherein the signals received from the second RF transceiver differ from signals sent by the second RF transceiver;
- means for creating a cryptographic key based upon the common sequence;
- means for encrypting a message with the cryptographic key; and
- means for sending the encrypted message to the second RF transceiver.

18. The apparatus of 17, further comprising:
- means for selecting the encryption level from a plurality of encryption levels including a relatively low level of encryption and a relatively high level of encryption; and
- means for generating the sequence having a length proportional to the selected level of encryption.

19. The apparatus of claim 17, further comprising:
- means for determining a value q and the value of M based on the selected level of encryption, wherein q is an integer representing an alphabet size for the common sequence;
- means for generating int(M/log 2([q])) symbols from the common sequence by dividing the common sequence into successive symbols, each symbol having log 2([q] bits; and
- means for generating the common sequence from the int(M/log 2([q])) symbols.

20. The apparatus of claim 17, further comprising:
- the means for determining the characteristics of the first and second RF transceivers includes means for determining computing resources available to the first and second RF transceivers; and
- the means for selecting of the level of encryption includes means for selecting the level of encryption based on computing resources available to the first and second RF transceivers.

* * * * *